United States Patent [19]

Estrada

[11] 4,051,751
[45] Oct. 4, 1977

[54] MACHINE FOR GENERATING SURFACES OF VARIOUS CHARACTERISTICS ON WORKPIECES

[75] Inventor: Otto Estrada, Medellin, Colombia
[73] Assignee: Ignacio Acevedo, Columbus, Ohio
[21] Appl. No.: 722,686
[22] Filed: Sept. 13, 1976
[51] Int. Cl.² .............................................. B23B 3/28
[52] U.S. Cl. ............................................ 82/12; 82/18
[58] Field of Search ................................... 82/12, 18

[56] References Cited

U.S. PATENT DOCUMENTS

| | | | |
|---|---|---|---|
| 2,568,040 | 9/1951 | Touvay | 82/12 |
| 3,079,731 | 3/1963 | Rawstron et al. | 82/12 |
| 3,490,336 | 1/1970 | Staub | 82/18 |
| 3,590,672 | 6/1971 | Cordier | 82/12 |
| 3,593,603 | 7/1971 | Gellert | 82/18 |
| 3,977,279 | 8/1976 | Hooker | 82/12 |

Primary Examiner—Harrison L. Hinson
Attorney, Agent, or Firm—William V. Miller

[57] ABSTRACT

A machine for generating surfaces of various characteristics on workpieces. It is similar in overall construction to the usual lathe which has a headstock for rotating the workpiece about its axis and a tool carriage which is mounted on a pivot for swinging movement relative to the headstock so that the tool, when adjusted into engagement with the face of the workpiece, will produce a spherical surface thereon. However, the present invention provides a special eccentric control unit in cooperation with the tool carriage for advancing or retracting it relative to the face of the workpiece, as the tool carriage swings, so that aspherical surfaces will be produced thereon by the tool. This eccentric unit is such that it can be readily set to obtain, accurately, surfaces of various preselected characteristics.

53 Claims, 13 Drawing Figures

MACHINE FOR GENERATING SURFACES OF VARIOUS CHARACTERISTICS ON WORKPIECES

BACKGROUND AND BRIEF DESCRIPTION OF THE INVENTION

Lathe-type machines including a headstock and a relatively wingable tool carriage, have been provided in the past with various attachments for advancing or retacting a cutting tool relative to the face of the rotating workpiece in order to produce aspherical surfaces. Often these attachments include cams or patterns, one for each particular curved aspherical surface to be produced on the workpiece. Other attachments have been provided which do not use a plurality of cams for the different curvatures but accomplish the necessary advancement and retraction of the tool in various ways.

The present invention provides a lathe-type machine in which the advancement and retraction of the cutting tool relative to the face of the workpiece, to obtain aspherical surfaces, is accomplished by a very simple and effective eccentric control unit which cooperates with the tool carriage to move it back-and-forth relative to the headstock during the swinging movement of the tool carriage about its pivot. The eccentric unit is such that it can be set for selected infinite variations of curves to be reproduced on the workpiece and the setting can be accomplished accurately and quickly by un-skilled persons.

The present invention will be described with reference to a lathe which is especially useful in cutting contact lenses of special characteristics or curvatures. However, the machine is useful in cutting, or otherwise generating, on various workpieces, surfaces of special characteristics.

Below are set forth examples of various types of cuts of contact lenses which the lathe of this invention is capable of producing in a single operation:

1. Cuts concave and convex curves either spherical or aspherical.
2. Cuts concave and convex curves that are spherical in the center with gradual flattening towards the periphery (a semi-spherical cut).
3. Cuts concave curves with a continuous change of radius from the center to the periphery (aspherical type).
4. Cuts convex curves with a continuous change of radius from the center to the periphery (aspherical type).
5. Cuts convex curves that are spherical in the center with a rapid change of radius at a determined point, producing a convex curve cut known as "lenticular cut" in the lens art and of a determined positive or negative value.

The lathe described herein provides extreme agility in its operation, maintaining a high degree of precision despite continued use, and achieving an easy reproduction of complex lenses with extraordinary simplicity.

BRIEF DESCRIPTION OF THE DRAWINGS

The best mode contemplated in carrying out this invention is illustrated in the accompanying drawings in which:

FIG. 5a is a vertical sectional view taken along line 5a—5a of FIG. 5.

DETAILED DESCRIPTION OF THE INVENTION

Figure 1:
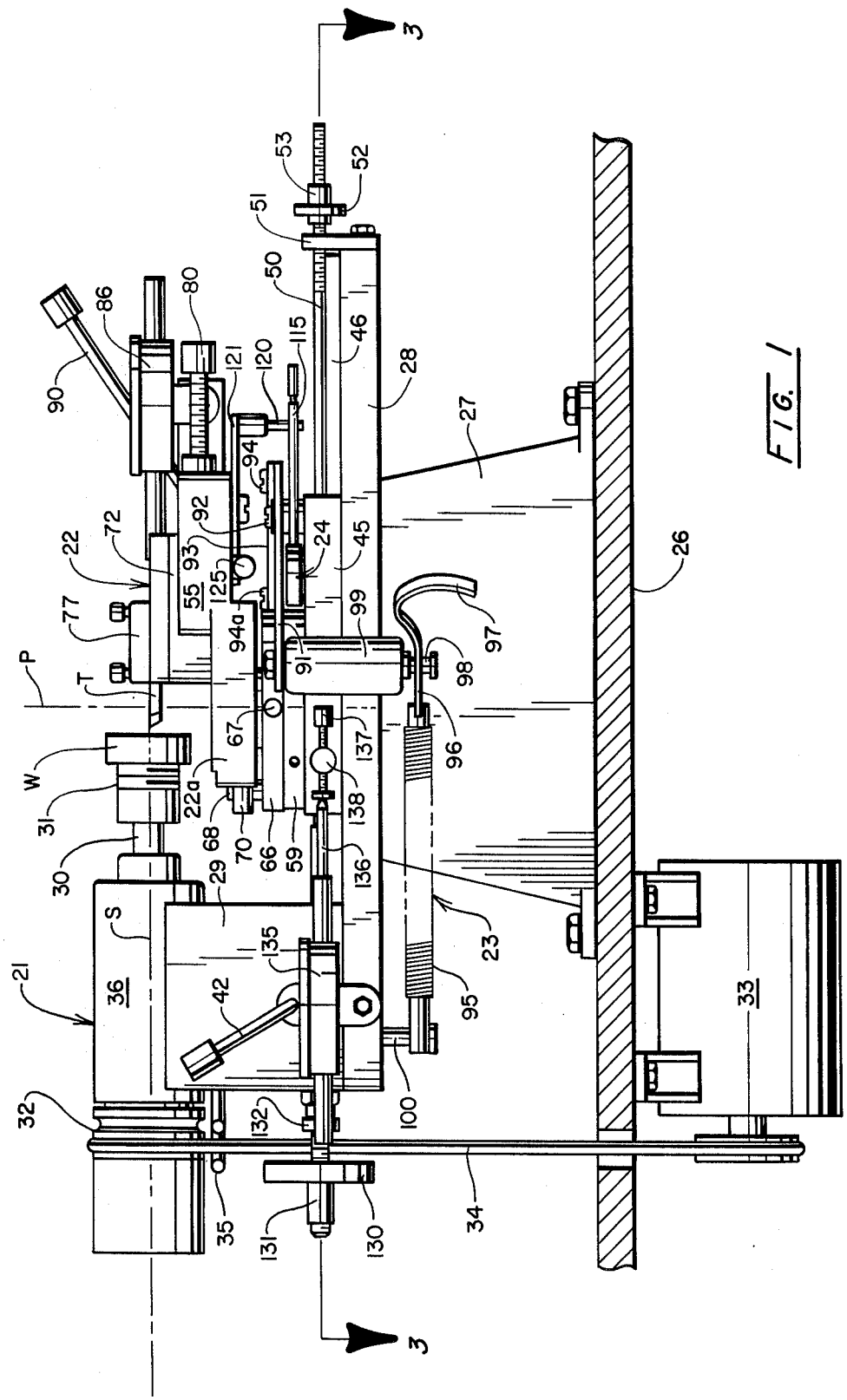
FIG. 1 is a view, mainly in side elevation but partly in longitudinal section, showing a lathe embodying this invention.
Figure 2:
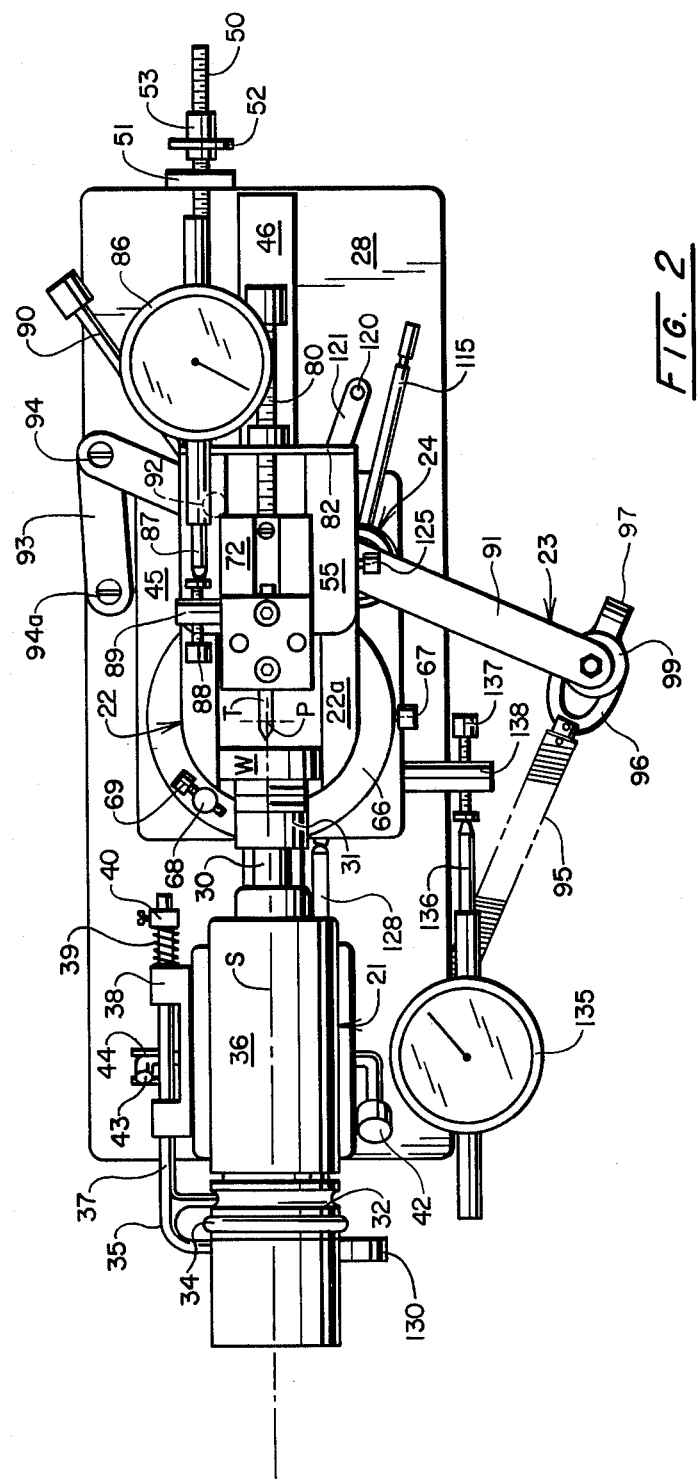
FIG. 2 is a plan view of the lathe of FIG. 1.
Figure 3:
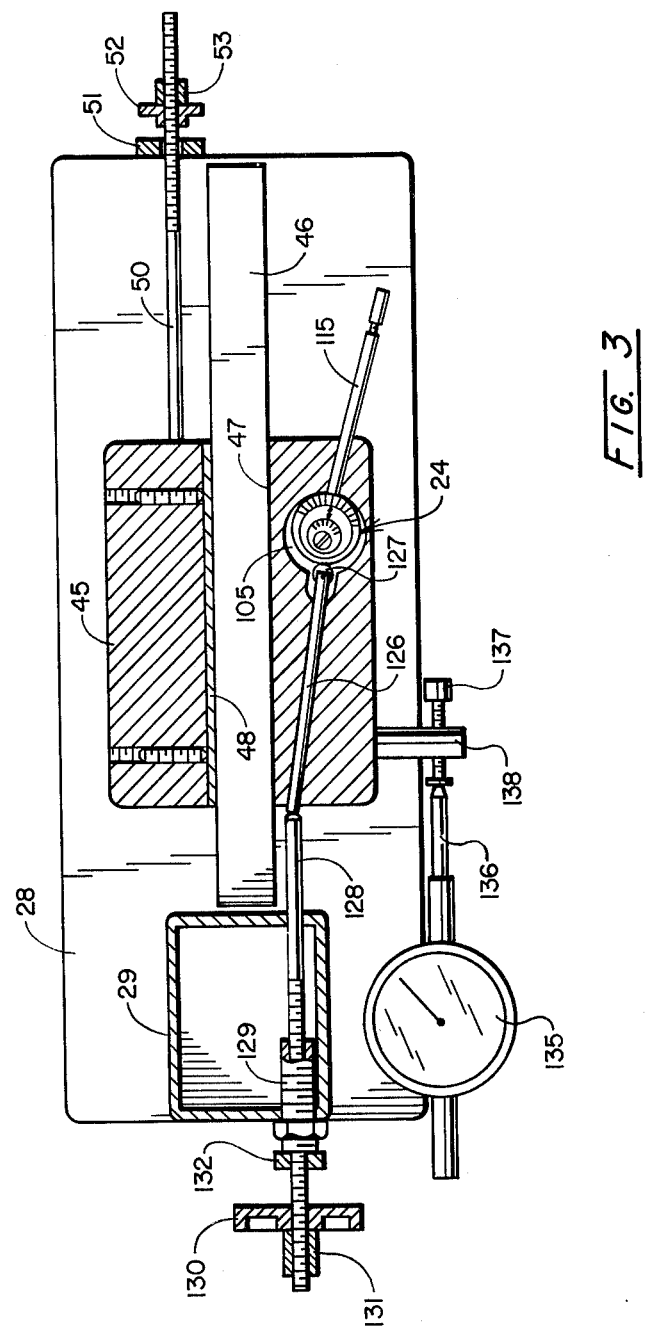
FIG. 3 is a horizontal sectional view taken along line 3—3 of FIG. 1.
Figure 4:
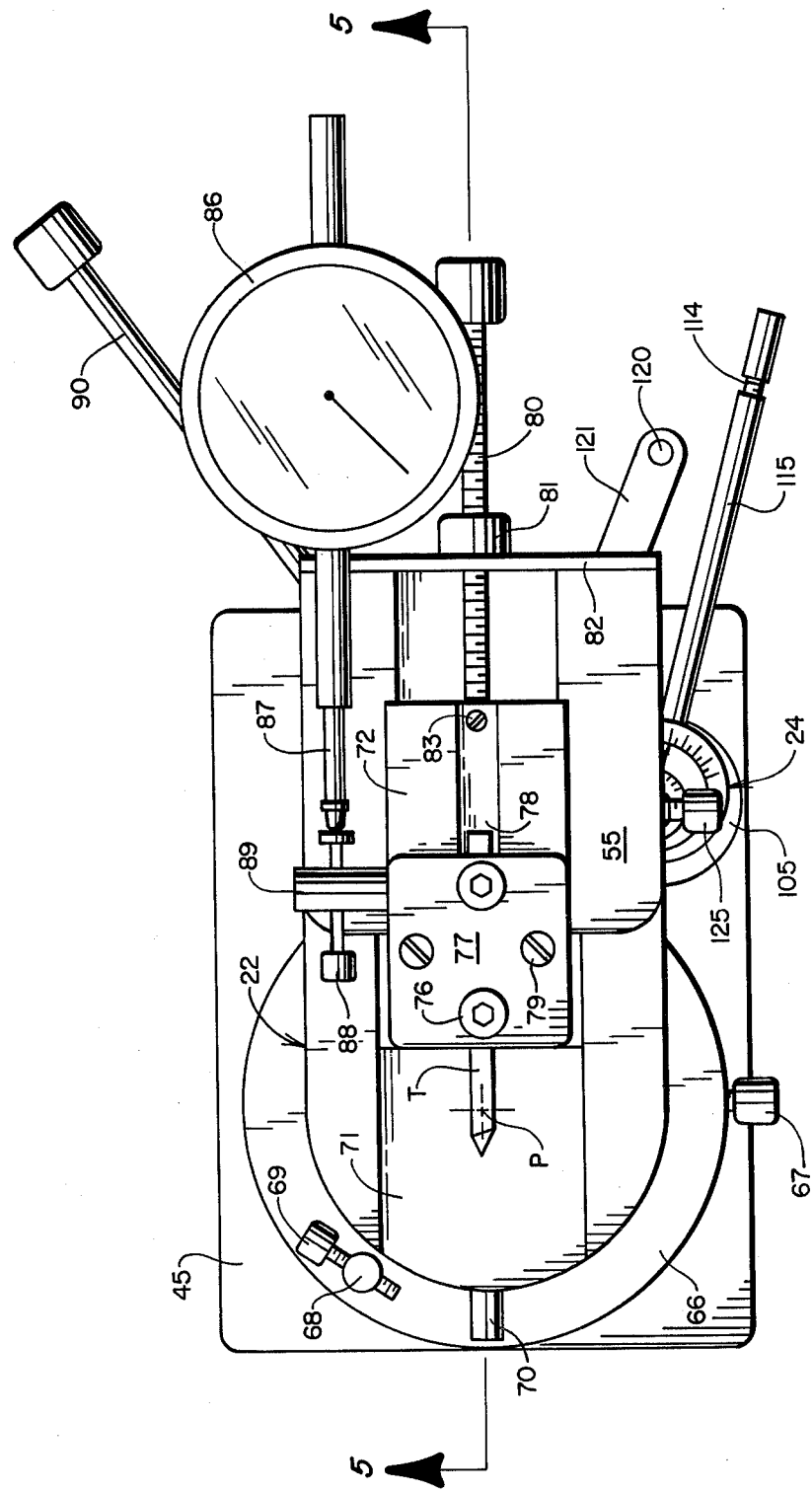
FIG. 4 is a plan view showing a tool carriage and associated parts with the cooperating eccentric control unit in accordance with this invention.

With specific reference to the drawings and particularly to FIGS. 1 to 3, an example of a lathe embodying this invention is shown and includes a headstock unit 21 and a cooperating tool carriage unit 22, swingable about a vertical pivot axis P, which can be advanced or retracted relative to the headstock. The tool carriage unit 22 is shown as carrying a suitable cutting tool T and the headstock 21 is shown as carrying, for rotation about its axis S, a workpiece W in the form of a lens blank to be cut by the tool T. According to this invention, a lever linkage and spring unit or mechanism 23 is mounted in cooperation with the tool carriage unit 22 for yieldingly biasing it toward the headstock 21 so that the tool T engages the face of the workpiece W, and an eccentric control unit 24 is mounted in cooperation with the tool carriage unit to control the advancing or retracting movement of the tool carriage unit, during swinging movement of the carriage unit, and, therefore, control the radius of the tool T on the face of the workpiece W to produce an aspherical or lenticular cut on the surface of the workpiece.

The machine is carried on a table 26 which supports the standard or pedestal 27 thereof that may be bolted to the table. At its upper end, the standard 27 supports a horizontally disposed flat bench plate 28. The headstock 21 includes the base 29 which is supported at the one end of the plate 28 and projects upwardly therefrom and which carries the horizontally-disposed rotatable spindle 30. The spindle mounts the workpiece W for rotation about its axis S preferably by means of a suitable self-centering chuck 31. A collet sleeve system (not shown) may be used for mounting the workpiece if desired. The spindle is preferably driven by a double-pulley 32 from a motor 33 by means of a belt 34. The motor 33 may be suspended below the table 26. One of the pulleys of the double pulley 32 is a free pulley so that when the belt 34 is shifted thereto, the drive to the spindle 30 will be interrupted. This permits mounting and dismounting of the work, without stopping the motor. The shifting of the belt is accomplished by means of a yoke 35 which engages the belt, and which is slidable mounted on the base 29. The yoke 35 is carried by a rod 37 slidably mounted in guides 38 on the base 29 and normally held in spindle-driving position by a compression spring 39 provided on the rod between one of the guides 38 and a collar 40 set thereon. The rod 37 is shifted to non-driving position, so as to free the spindle, by means of a lever which has a transversely disposed portion in the base 29 for rocking movement, an upstanding activating handle 42 at one side of the base, and an upstanding rod-shifting portion 43 at the opposite side of the base, with its upper extremity disposed between a pair of lugs 44 carried by the rod.

Figure 5:
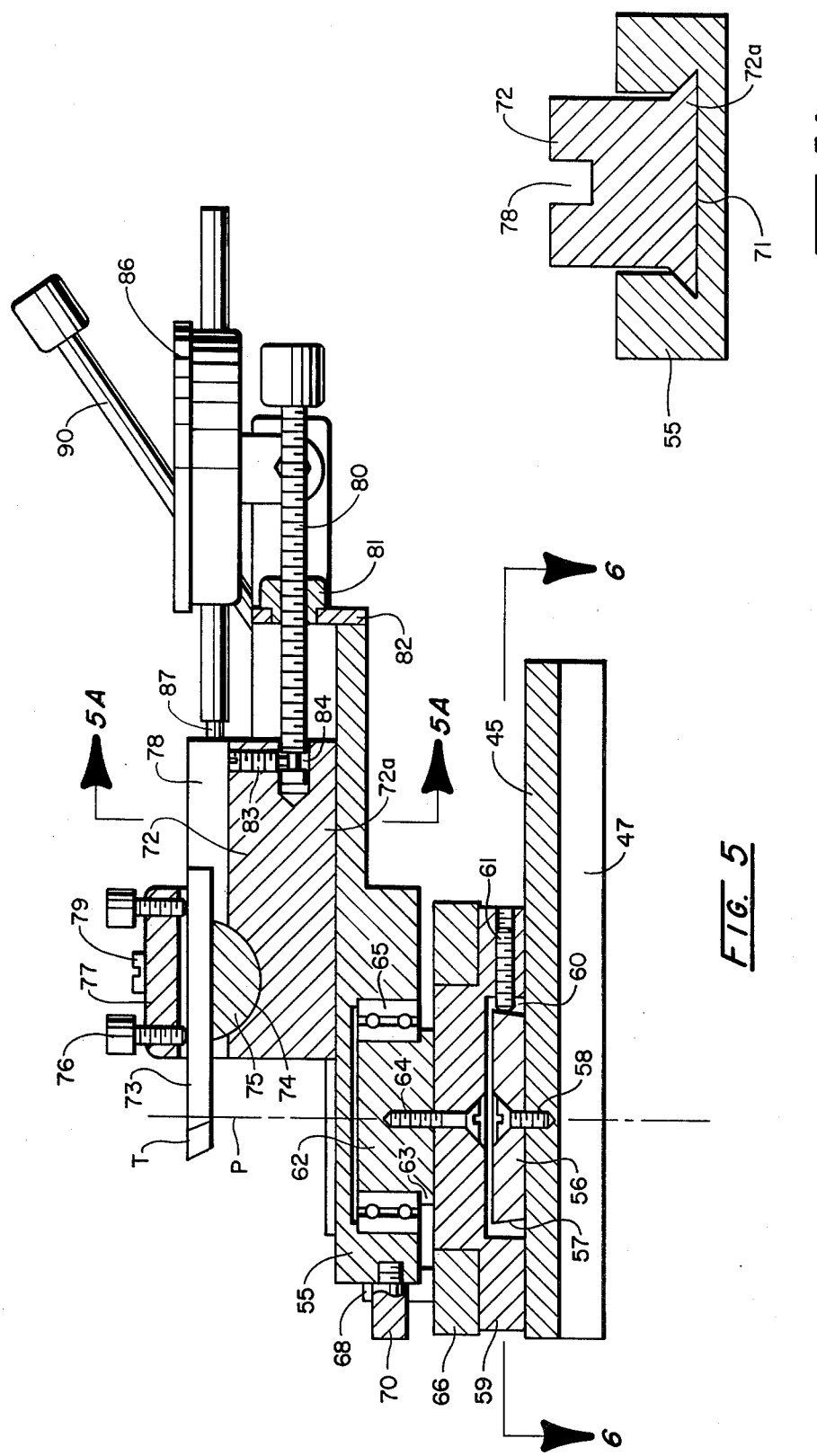
FIG. 5 is a vertical sectional view taken along line 5—5 of FIG. 4.

The tool carriage unit 22 is mounted on the base plate 28 for movement longitudinally thereof to advance or retract it relative to its headstock 21. The tool carriage unit 22 includes the flat base plate 45 which is of less width than the bench plate 28 and is disposed flat againt the bench plate for sliding movement thereon. As shown in FIG. 3, the bench plate 28 is provided with a central guide portion 46, of rectangular transverse cross-section, which extends the full length thereof and is located at the longitudinal centerline thereof. The base plate 45 of the tool carriage, as shown in FIGS. 3 and 5, is provided at its longitudinal centerline with a longitudinally extending guide slot 47, opening downwardly, and extending the complete length thereof, the slot being complemental to the guide 46 over which it fits. At one side of the slot 47 is a shim 48 of soft metal, such as brass, which can be adjusted by screws, extending through the plate 45 into the slot, into firm contact with the guide 46 so as to provide a tight but sliding fit on the guide.

The movement of the base plate 45 on the bench plate 28 toward the headstock 21 can be limited by means of a stop arrangement including a screw 50 having its inner or forward end anchored in the edge of the plate 45 and its outer end passing freely through an opening in an upstanding lug 51 at the outer or posterior edge of the bench plate 28. A small stop wheel 52 is screwed on the outer threaded end of the screw 50 and may be locked in adjusted position by a locking nut 53 threaded thereon. Thus, the plate 45 will slide forwardly on the plate 28 until the stop wheel 52 strikes the stop lug 51. This will determine the depth of the cut of the tool T into the workpiece W, as will later appear.

As shown best in FIGS. 1, 2, 4, 5 and 6 the base plate 45 of the tool carriage unit 22 carries a pivot structure which pivotally mounts the guide arm 55 in which the tool-carrying slide 72 is adjustably mounted. This pivot structure comprises a mounting disc 56, which has an inwardly and downwardly beveled edge 57 (FIG. 5), that is fixed to the upper surface of the base plate 45, at the anterior end thereof, by means of a centrally-disposed screw 58. A pivot-carrying member 59 of annular form fits over the disc 56, being provided with a downwardly-opening socket 60 which is of greater diameter than the disc 56. Threaded through the wall of this socket are a plurality of radially-extending equally angularly spaced centering and locking screws 61 (FIGS. 5 and 6) which can be selectively adjusted into contact with the beveled edge of the disc 56. Thus, the screws will not only releasably retain the pivot-carrying member 59 down on the base plate 45, but will center it laterally on the plate relative to the axis of the headstock spindle 30. The pivot-carrying member 59 carries the upstanding pivot 62 of cylindrical formation with a retaining lip 63 at its lower end and this member rests on the upper flat surface of the member 59 and is retained and centered thereon by means of a screw 64 extending upwardly into the lower surface thereon from the socket 60. The pivot member 62 receives a suitable ball-bearing 65 which fits in a downwardly-opening socket in the curved anterior end of the arm 55. Thus, the arm 55 is mounted at its forward or anterior end by the described pivot structure for swinging movement about the vertical pivot axis P. A stop arrangement is provided for limiting this swinging movement so that the tool is initially located at the center of the workpiece W that is, the spindle axis S. This includes a ring 66 (FIGS. 4 and 5) rotatabily mounted on the member 59 and set in a predetermined position thereon by means of a setscrew 67. The ring carries on its upper surface an upstanding pin 68 with an adjustable stop screw 69, extending transversely therethrough, which is adapted to engage with a radially-extending stop pin 70 on the curved end of the arm 55. Thus, this stop structure is accurately adjustable to stop the swinging of the arm 55 in one direction at a precise point.

The upper surface of the arm 55 is provided with a central longitudinal undercut guideway 71 extending the complete length thereof. This guideway receives for sliding movement, the lower dovetail slide portion 72a of the tool-carrying slide 72 (FIG. 5a). A special arrangement is provided to adjust the tool T, shown as a cutting bit 73 (FIG. 5), so that its cutting point will be located vertically exactly at the axis S of the workpiece W carried by the spindle 30 on the headstock 21. For this purpose, the upper surface of the block slide 72 is provided with a concave semicircular socket 74 opening upwardly into a groove 78. The tool bit is rigidly secured to the upper edge of a semicircular convex mounting member 75, extending completely across and beyond it. The member 75 is complemental to and rocks within the socket 74. The rocking is accomplished by a pair of screws 76, forwardly and rearwardly of the center of the socket 74, which are carried by a bridging strip 77, which extends over the slot 78 that is formed in the top surface of member 72, and is removably clamped in position thereon by bolts 79. Thus, it will be apparent that by selectively adjusting the screws 76, the bit 73 may be tilted in the slot 78 to accurately center it vertically. Also, the bit and its support member can be easily removed and replaced by removal and replacement of the strip 77.

The slide 72 is adjusted in the guideway 71 by means of a screw 80 which is threaded through a nut 81 fixed in an upstanding plate 82 at the posterior end of the arm 55. The forward end of the screw is rotatably secured within a bore in the slide 72 by means of a screw 83 having a reduced inner end extending into a circular groove 84 in the adjusting screw 80. The adjusting screw has on its outer end a knob which may be used to turn the screw to selectively slide the tool-carrying slide 72 forwardly or rearwardly on the arm 55.

To indicate the position of the slide 72 in the guide 71, a micrometer indicator 86 may be carried by the upstanding plate 82 on the posterior end of the arm 55 and is provided with a forwardly-projecting actuating plunger 87. The plunger 87 is biased against a stop screw 88 (FIG. 4) which is adjustably carried, for forward and rearward adjustment, in a lug 89 extending outwardly from the slide 72. Thus, a means is provided for quickly adjusting the cutting tool T anteriorly or posteriorly relative to the axis P about which it pivots. To swing the arm 55 about its pivot or to move the tool carriage 22 anteriorly or posteriorly manually, a handle 90 is rigidly carried at the posterior end of the arm 55 and extends rearwardly and upwardly therefrom.

As previously indicated and as shown best in FIGS. 1, 2, 9, and 10, the lever and spring unit 23 is provided for yielding biasing the tool carriage 22 toward the headstock 21 and the spindle-carried workpiece W thereon. This mechanism cooperates with the eccentric control unit 24 to advance or retract the base plate 45 and the tool carriage 22 carried thereby on the bench plate 28 and thereby to advance or retract the cutting tool T relative to the workpice W on the spindle. The mechanism includes a main lever 91 which extends transversely over the posterior portion of the base plate 45 beneath the arm 55. The one end of this lever 91 is pivoted at 94 to a link 93 which extends forwardly to an upstanding pivot pin 94a which is carried by the bench plate 28 at one side of the plate 45. To connect the lever 91 to the plate 45, an upstanding pivot structure 92 is provided on the plate adjacent its one posterior corner (FIGS. 2 and 9) and includes a pin fitting into an opening in the lever close to the location of the pivot 94. Thus, the lever will rock about the pivot 92 and is pivoted to the link 93. The opposite end of the lever 91 projects outwardly at the other side of the bench plate 28 and is connected to the rear and outer end of a tension spring 95 by means of a coupling ring 96, connected to the spring and having a handle hook 97, whereby it can be quickly slipped on and off the downwardly projecting flanged pin 98 on the lower end of the handle knob 99. The handle knob can be used in manually swinging the lever 91, when desired. The spring 95 is anchored at its other end to the anterior end of the bench plate 28 by a pin 100 depending from that plate. Normally, the spring will pull the long end of the lever 91 forwardly about the pivot 94 and will urge the entire tool carriage 22 forwardly, since the plate 45 will slide on the guide 46, the lever also rocking about its pivot connection 92 to the plate 45 and the link 93 swinging about pivot 94a to prevent binding. The spring 95 can be readily uncoupled from the lever when desired. By means of the handle 99, the tool carriage unit 22 can be quickly moved rearwardly on the guide 46 to vacate the lens-mounting or dismounting areas.

As previously indicated, the base plate 45 with the tool-carrying unit 22 is advanced or retracted on the guide 46 to vary the surface produced by the tool T on the rotating workpiece W as it sweeps across the face thereof, due to the swinging of the tool-carrying arm 55 about the pivot axis P. This is a positive advancing or retracting movement under the control of the eccentric unit or assembly 24, which is shown in FIGS. 1 to 4, 6, 7 and 10 to 12, in cooperation with unit 23 and is actuated during the swinging of the arm 55 by means to be described.

Figure 6:
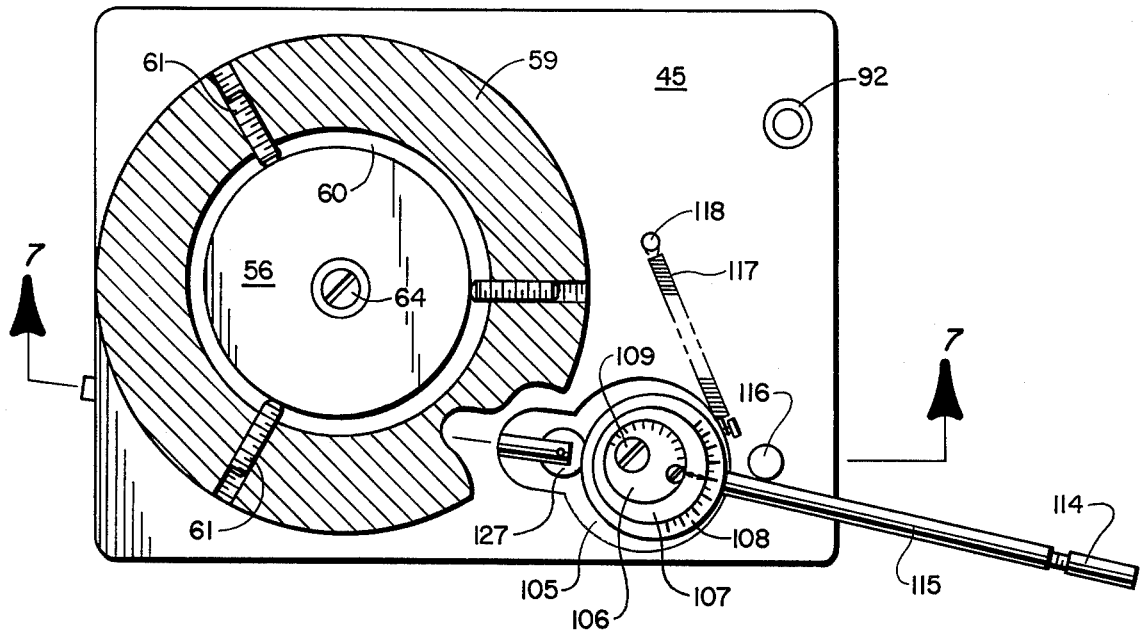
FIG. 6 is a horizontal sectional view taken along line 6—6 of FIG. 5.

The eccentric assembly is located in a cavity 105 formed in the plate 45 close to its one posterior corner opposite the location of the pivot 92 (FIG. 6). It will be noted (FIGS. 11 and 12) that the eccentric includes three eccentric members 106, 107 and 108 which are mounted in cooperative relationship and are relatively rotatably or angularly adjustable, all of these members being carried by a stud bolt 109 threaded into a socket in the bottom of the cavity 105. The bolt passes eccentrically through the inner or first member 106 which is of substantially cylindrical form but which has a notch 110 in its upper peripheral portion that receives a wedging setscrew 111. The second eccentric member 107 is a substantially crescent-shaped loop which fits rotatably around the inner member 106. The second eccentric member 107 may be rotatably adjusted on the member 106 by loosening the screw 111, rotating the member and then tightening the screw to hold it in adjusted position, it being understood that the screw also engages with the inner surface of the member 107. The third eccentric or outermost member 108 surrounds the circular recessed outer surface 112 at the upper end of the member 107 and is rotatably adjustable thereon. This member has an actuating or rocking lever 115 (FIGS. 6 and 7) mounted in the heavier portion thereof and extending radially therefrom over and beyond the adjacent corner of the plate 45. This lever is tubular and has a clamping screw 113 threaded therein and having its inner end sliding through an aligning opening in the outer eccentric 108. By means of a knob 114, the inner end of the screw can be brought into or out of engagement with the member 107. Thus, the member 108 can be rotated on the member 107 and fixed in adjusted position. The inner eccentric member 106 may be provided with a calibrated scale A on its upper surface and the member 108 may be provided with a similar scale B. An upstanding stop pin 116 is fixed on the plate 45 for engaging the lever 115 to limit innermost swinging movement about the axis E of the screw 109 or the axis of rotation of the clamped eccentric assembly. A tension spring 117 has its outer end connected to the lever 115 and its inner end anchored to the plate 45, at 118, to normally bias the lever against the stop 116.

The rotation of the eccentric assembly about its axis E, to produce advancement or retraction of the tool-carriage unit 22, is accomplished by swinging the lever 115 at a predetermined period during the swinging movement of the tool-carrying arm 55 about the pivot axis P. This will swing the lever 115 outwardly, away from the fixed stop 116, and is accomplished by means of an actuating pin 120 carried by and depending from the posterior end of the arm 55, this pin being shown best in FIGS. 1, 2, 4 and 8. The pin 120 is adjustably carried by the arm 55 by means of a lever 121 pivoted at 122 to the lower surface of the arm. The pin 120 is on the outer end of the lever 121 and the inner turned end of this lever is engaged by an adjusting screw 123 which is threaded transversely through a pin 124 depending from the lower surface of the arm 55. Adjustment of the pin 120 is accomplished by turning the knob 125 so as to swing the lever 121 and move the pin laterally inwardly or outwardly, thereby varying the instant, during the swinging of the arm 55, when the eccentric rotating lever 115 will be engaged.

As shown best in FIGS. 3, 6, 7 and 10, so that the eccentric assembly, when rocked about the axis E, will advance or retract the tool-carrying unit 22 on its guide 46, a rod 126 is mounted in the plate 45. This rod extends from the anterior edge of the plate into the eccentric-receiving cavity 105 and carries an eccentric contacter in the form of a small roller 127 which engages the outermost eccentric member 107. This rod 126, is slidably mounted in a suitable bore but is normally held in an eccentric-engaging position by means of a screw 128 having its end engaging the outer end thereof. This screw extends through the headstock base 29, being threaded through a nut 129 fixed on the forward wall thereof. The anterior end of this screw 128 carries a handwheel 130 and a lock nut 131 threaded thereon so that, when engaged, the screw 128 can be positioned forwardly or rearwardly to regulate the advance of the tool-carrying unit 22. A lock nut 132 is threaded on the screw inwardly of wheel 130 and when advanced to engage the outer end of the sleeve 129, will lock the screw 128 in axially adjusted position.

To indicate the displacement of the tool-carrying unit, a micrometer gauge 135, as shown in FIGS. 1 to 3 and 10, may be provided and will be carried by the bench plate 28 at the anterior end thereof. This gauge includes an outwardly spring-biased plunger 136 that engages the end of a stop screw 137 which is threaded through a lug 138 projecting laterally outwardly from the plate 45.

OPERATION OF THE MACHINE

In the operation of the machine, the workpiece W, in the example shown the lens blank, is mounted by the chuck 31 on the spindle 30 for rotation about its axis S. The motor 33 is started and the belt 34 is shifted, to drive the spindle, by means of the lever 42 which is on the side of the machine towards the observer (FIG. 1). All other adjustments on the machine are readily accessible from this one side. The drive to the spindle can be interrupted by means of the handle 42 to permit removal and replacement of the workpiece W without stopping the motor.

Prior to starting the motor, all the other necessary adjustments may be made. It will be apparent that if the cutting edge of the tool T is anteriorly of the pivot axis P, the surface produced on the lens blank W will be concave, whereas if the tool cutting edge is posteriorly of the pivot axis P, the surface produced on the lens blank will be convex. The headstock 21 is fixed on the bench plate 28 and the plate 45 must be adjusted on the guide 46 to move the tool-carrying unit 28 anteriorly or posteriorly on the bench plate 28 and relative to the fixed headstock base 29. This can be accomplished by quickly turning the wheel 52 to the necessary axial position on the screw 50 and slide the plate 45 on the plate 28 by the handle 99 depending from lever 91 to properly position the pivot axis P. Along with this adjustment, the screw 80 is turned to slide the tool-carrying slide 72 on the arm 55 to properly position the cutting edge of the tool. The gauge 86 will register the position of the slide 72 on the arm 55. During these adjustments, the lever and linkage unit 23 may be rendered inoperative by releasing the ring 96 from the pin 98, by means of the hook 97, and the connection may again be made readily, after the adjustments are completed.

If only spherical curvatures are to be produced on the lens blank W, the eccentric unit 24 will not be used. To render it inoperative, it will be necessary merely to remove the handle 115 which is friction-fit into the outer eccentric ring 108, or to remove actuating pin 120, advancing movement of plate 45, in small increments, being permitted by turning screw 128 in the proper direction.

The unit 23 as previously indicated, will advance the tool-carrying unit 22, due to the spring 95 exerting a biasing force, which will slide the plate 45 forwardly on the plate 28. This will cause the pivot axis P to advance forwardly along the center line of bench plate 28, in the same plane as spindle axis S and at a right angle thereto. The position of the unit 22 on the plate 28 will be indicated by the gauge 135. After the thickness of the lens blank W and the depth of the cut to be produced therein are determined, the stop wheel 52 is adjusted on the screw 50 to be spaced from the plate 51 a predetermined distance corresponding to the depth to be cut which is usually done in small increments. At this time, if the tool T is adjusted into contact with the face of the lens blank W, the thickness of the cut to be produced will be registered by the gauge 135. If the arm 55 of the unit 22 is now swinging about the pivot axis P, the tool T will be kept in contact with the work W by the spring 23 and associated linkage of the unit 23, and the resultant curvature produced will be spherical. The swinging of the arm 55 may be a accomplished by gripping the handle 90 and the cutting will continue unitl the stop wheel 52 strikes the plate 51. The drive to the lens blank W may be interrupted at this time by shifting the handle 42. The entire unit 22 can then be moved quickly away from the lens blank W by first disengaging spring 95 and then grasping the handle 99 of the unit 23.

Although the machine is capable of producing spherical surfaces as indicated above, it is equipped with the eccentric control unit 24 to make the machine especially suitable for producing aspherical surfaces. If an aspherical surface is to be produced, the eccentric handle or lever 115 and pin 120 are replaced on the outermost rocking eccentric member 108. The rest of the machine will be set up as previously indicated for cutting the spherical surface on the lens blank W. However, at this time, the screw 128 will be used and, along with the rod 126 will cooperate with the eccentric, as it is rocked, to control advancement or retraction of the plane 45 on the guide 46 and therefore, the tool T relative to the face of the lens blank W thereby producing an aspherical cut on the surface of the workpiece as it rotates with the spindle about the axis S. Usually in forming an aspherical cut, the first cuts made are spherical until the lens approaches or reaches its desired thickness at the center. This will be accomplished by having the stop wheel 52 so set as to permit inward movement of the plate 45, with the screw 128 being in its final adjusted position so that, at this time, it will not contact the rod 126 and the plate 45 will, therefore advance. As indicated, this cutting is usually done in small increments. As the advance is stopped finally by the stop wheel 52, the rod 126 contacts the screw 128, and the eccentric unit 24 takes over control to change the radius as the cutting tool T swings across the face of the lens blank W to produce the variation in curvature resulting in an aspherical surface. This variation in curvature will be indicated on gauge 135. The spring 95, when connected, will bias the cutting tool into contact with the workpiece but when disconnected, this biasing action can be accomplished manually with the handle 99.

Figure 10:
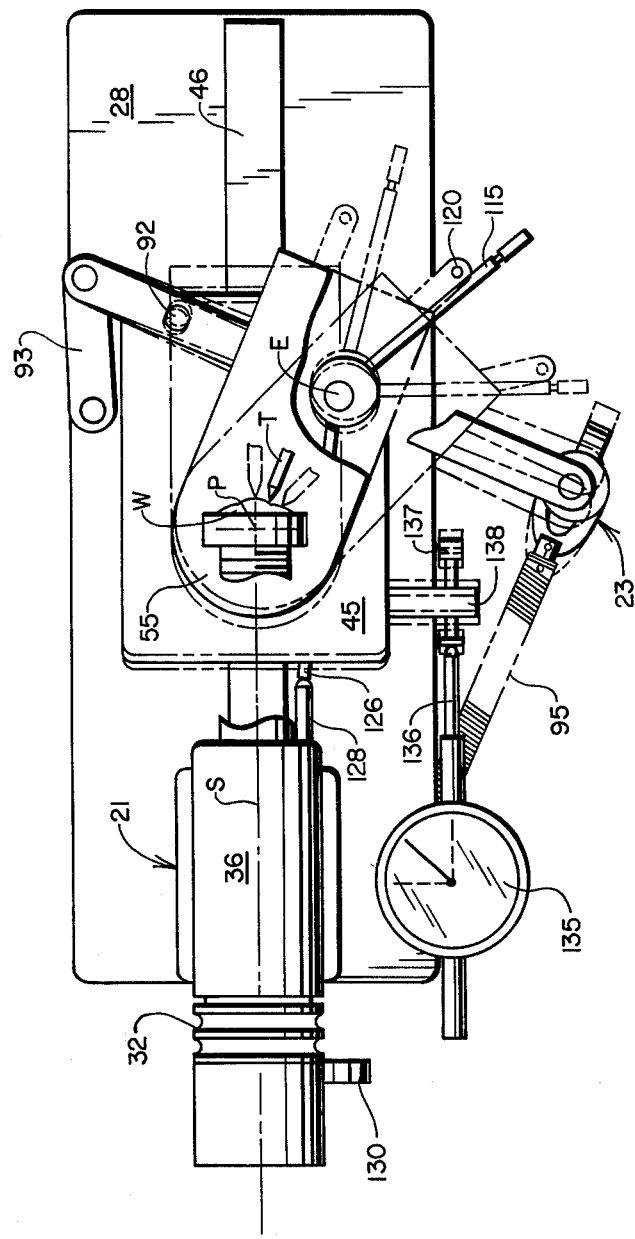
FIG. 10 is a schematic plan view illustrating the action of the eccentric control unit during the swinging movement of the tool carriage.

As indicated diagrammatically in FIG. 10, the eccentric is rocked, as the arm 55 swings about the pivot axis P and carries the actuating pin 120 therewith. The pin will contact the lever 115, as it reaches a predetermined point in its outward swing, and will then cause outward swinging of the lever, against the force of spring 117, and the point at which this control occurs can be varied by selectively setting the pin inwardly or ououtwardly by turning the screw knob 125. Swinging of the lever 115 outwardly, rotates the eccentric assembly clockwise about the eccentric axis E and since the eccentric engages the contact roller 127 on the fixed rod 126, the plate 45 will be advanced or retracted positively by the eccentric rotation, actuated by the swing of arm 55, in cooperation with spring 95. This will cause the tool T to transverse a non-circular arc and thereby produce an aspherical curvature on the face of the lens blank.

Figure 7:
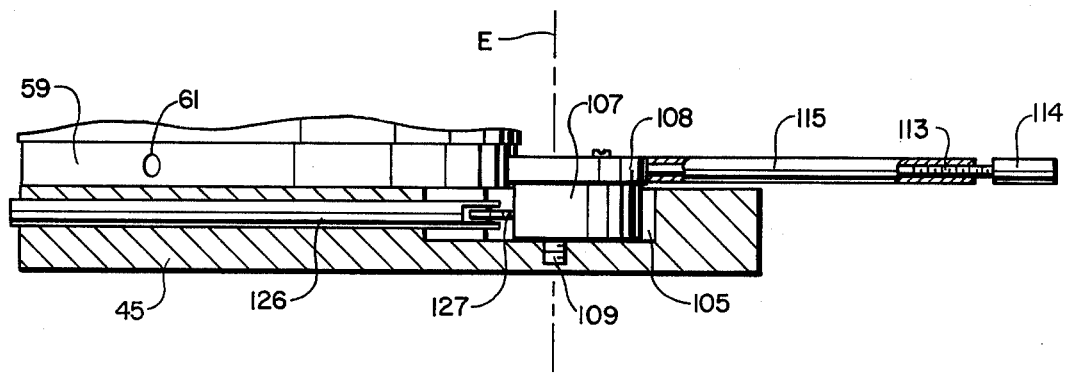
FIG. 7 is a vertical sectional view taken along line 7—7 of FIG. 6.
Figure 8:
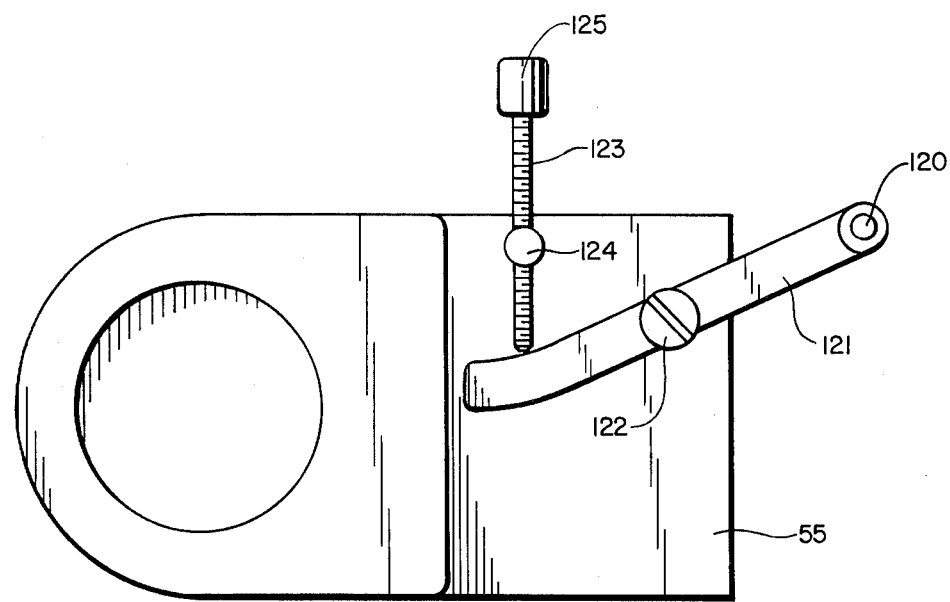
FIG. 8 is a view of the lower side of the tool carriage pivot arm removed to show an adjustable stop structure forming a part of the eccentric control unit.
Figure 9:
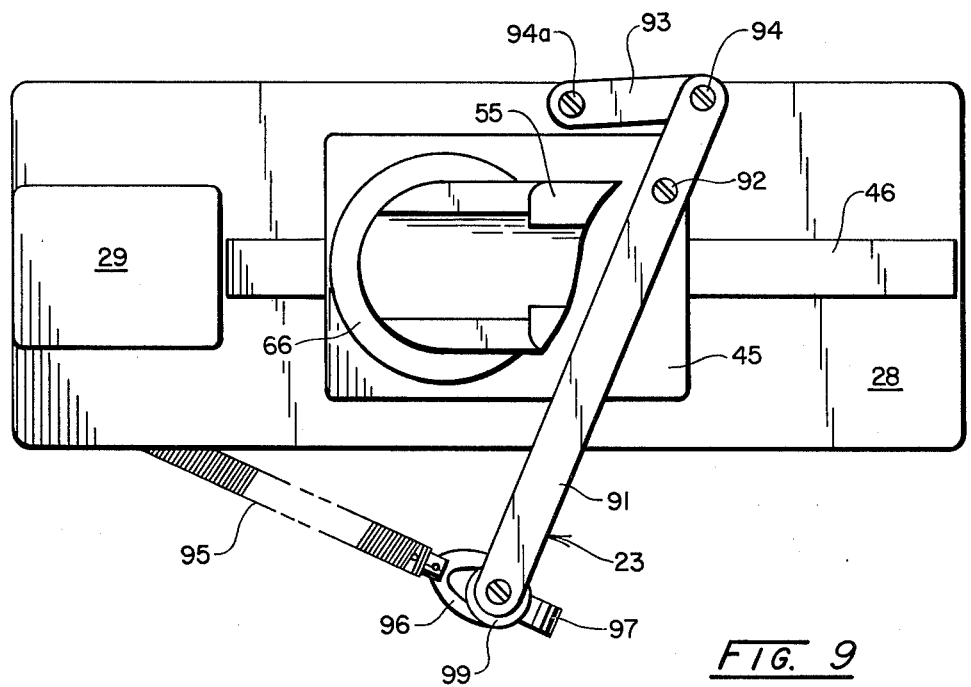
FIG. 9 is a plan view of the linkage and spring mechanism which biases the tool carriage toward the headstock.
Figure 11:
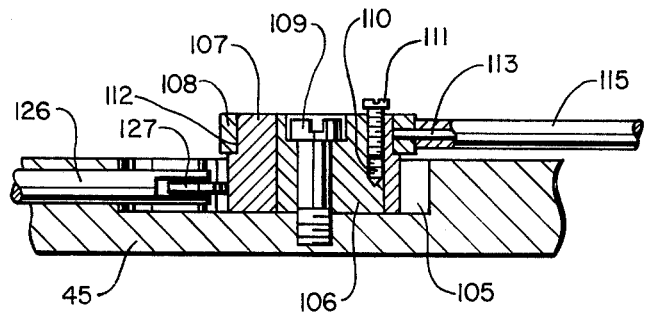
FIG. 11 is a detail in vertical section of the eccentric unit taken along line 11—11 of FIG. 12.
Figure 12:
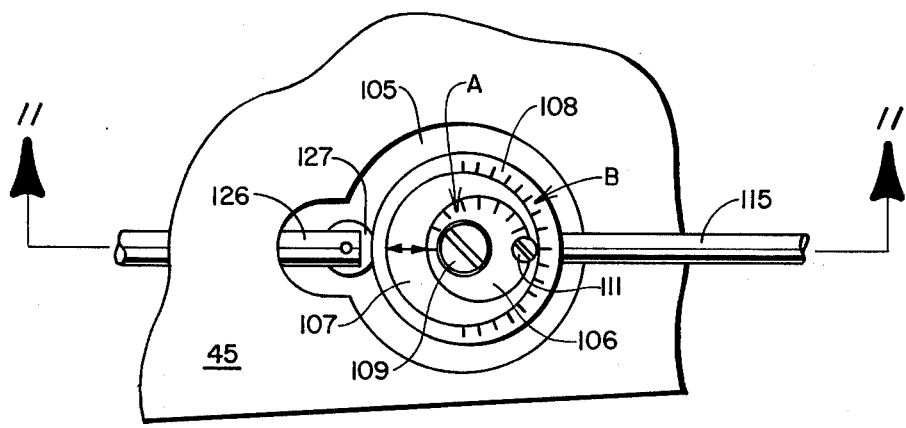
FIG. 12 is a plan view of the eccentric unit.

It will be apparent that the various parts of the eccentric assembly can be adjusted relatively from a zero position, indicated in FIGS. 10 and 11, where no movement of the tool carriage will be produced because it is a concentric position, to a position of maximum eccentricity, which is shown in FIGS. 6 and 7, to obtain maximum movement of the tool carriage. Also, it will be apparent that the point of change from spherical to an aspherical curve radially on the lens blank will be determined by the initial positioning of the actuating pin 120 which engages the eccentric rocking arm 115. With these adjustments, any of the lens surfaces indicated in the discussion of the background of this invention can be produced, as well as many others.

In the preceeding description, it has been specified that the tool is carried on the swingable arm and the workpiece does not pivot but it is to be understood that these conditions could be reversed. Also, it is specified that the tool is a cutting bit but it is to be understood that other types of generating tools could be used, such as driven diamond cutting tools, milling tools, various abrading tools, etc. Furthermore, although, the invention has been described specifically with reference to producing lenses, it is obvious that it is applicable to the generating of surfaces on various workpieces.

Having thus described the invention, what is claimed is:

1. A machine for generating surfaces on a workpiece member comprising a unit for supporting a workpiece member and a unit for supporting a generating tool member so that the tool member carried thereby will engage the workpiece member carried by the first unit, one of said units being mounted for pivoting movement about a pivot so that the tool member will travel across the workpiece member with a predetermined radius, means for advancing or retracting one of said members relative to the other member during the pivotal movement of the unit to change said radius on the surface of the workpiece, said means including an eccentric unit; said unit which is mounted for pivotal movement including a moveable support which supports its said member for advancing or retracting movement relative to the other unit which includes a relatively fixed support, said eccentric unit being rotatably mounted on said moveable support, means for rotating said eccentric unit in response to pivotal movement of the pivoted unit, and means for biasing said moveable support in one direction to cause yielding contact between said members, said eccentric unit being rotatably mounted on the moveable support in cooperative relationship to a contact portion relative to which said moveable support can move and which is operatively connected to said fixed support, said biasing means also biasing said moveable support to a position where said contact portion is engaged by said eccentric unit.

2. A machine according to claim 1 in which the eccentric is formed of a plurality of relatively adjustable parts so as to vary its degree of eccentricity.

3. A machine according to claim 1 in which said eccentric is mounted on said fixed support for rocking movement, an actuating arm extending from said eccentric for rocking it, and means on the pivoted unit for engaging said arm at a predetermined position during its pivoting movement.

4. A machine according to claim 3 in which said last-named means is adjustable to vary the point of engagement.

5. A machine according to claim 4 in which the eccentric is an assembly of relatively adjustable eccentric parts mounted on a supporting pin, and means for securing the parts in various relatively adjusted positions around the pin.

6. A machine according to claim 1 including means for releasing said biasing means.

7. A machine according to claim 1 in which the one member is supported for rotation about an axis and the other member is carried by said movable support which is mounted on the pivoted unit, said pivot being disposed at a right angle to said axis.

8. A machine according to claim 7 in which the workpiece member is carried for rotation by a driven spindle carried by the one unit and the tool member is carried by said movable support of the other unit.

9. A machine according to claim 8 in which the tool is carried by a slide adjustably mounted on said movable support.

10. A machine according to claim 9 in which said slide includes a tool clamp for receiving and clamping a tool bit, said bit having a semicircular mounting portion, and said clamp including a complemental socket for receiving said mounting portion and adjusting screws for rocking it to different positions in said socket.

11. A lathe-type machine for generating surfaces on a workpiece according to claim 1 comprising a bench plate, said unit for supporting the workpiece comprising the fixed support in the form of a headstock unit mounted on the bench plate and supporting a spindle on which the workpiece is adapted to be mounted, means for driving the spindle about its axis, said tool-carrying unit being supported by said bench plate and adapted to position the generating tool in cooperation with the spindle-mounted workpiece, said tool-carrying unit comprising said moveable support in the form of a base plate mounted on the bench plate for movement along a centerline in the same plane as the spindle axis, a tool carriage arm mounted on said moveable base plate for swinging movement about a pivot having its axis at a right angle to said spindle axis and in said plane, said biasing means yieldingly biasing said moveable base plate on the bench plate toward the headstock unit to cause the supported tool and work-piece to engage each other, said eccentric unit being mounted for rocking movement on said base plate and engaging said contact portion which is moveably mounted on said base plate, to advance or retract said base plate relative to said headstock, and said means for rotating said eccentric unit in response to pivotal movement of said arm comprising rocking means.

12. A machine according to claim 11 including an electric motor for driving the spindle, a drive means connecting the motor to the spindle, and means for selectively disconnecting said drive means.

13. A machine according to claim 11 including means for selectively disconnecting said biasing means from said base plate.

14. A machine according to claim 11 in which the tool-carrying base plate is slidably mounted on the bench plate for movement toward and from the headstock, said biasing means comprising leverage operatively connected to said base plate, and a spring connected to said leverage and to said bench plate.

15. A machine according to claim 14 in which said spring is connected by a releasable connection.

16. A machine according to claim 15 in which said leverage includes an actuating handle for manually actuating it.

17. A machine according to claim 14 including a gauge operatively connected to said base plate for indicating its position on said bench plate.

18. A machine according to claim 11 in which means is provided for rockably mounting the eccentric on the bench plate with its periphery engaging the moveable contact portion carried by said base plate, said mounting means locating the eccentric posteriorly and laterally of the pivot.

19. A machine according to claim 18 in which the eccentric is an assembly of a plurality of relatively rotatable eccentric members, and means for fixing the members in relatively adjusted positions.

20. A machine according to claim 19 in which the contact portion is on the end of a rod slidably mounted on the base plate, and engages with a fixed contact portion in the form of a screw carried in a fixed position relative to the bench plate for engaging and adjusting said rod.

21. A machine according to claim 20 in which the screw is carried by a part of the headstock unit.

22. A machine according to claim 21 including a gauge carried by the bench plate and having an actuating plunger engaged by a member carried by said base plate to indicate the position of the base plate on the bench plate.

23. A machine according to claim 21 in which a roller is provided as the eccentric contact portion.

24. A machine according to claim 21 in which the means for rocking the eccentric comprises an actuating lever extending outwardly therefrom, and means on said pivoted tool-carriage arm for engaging said lever at a predetermined position during its pivotal movement.

25. A machine according to claim 24 in which said engaging means is carried on said arm for adjustment to vary the point of engagement.

26. A machine according to claim 25 in which said engaging means is in the form of a depending pin carried by a lever pivoted to the lower side of said arm, and means for adjusting said lever about the pivot and holding it in adjusted position.

27. A machine according to claim 26 in which the tool is carried on the arm by a slide which is adjustable toward and from said pivot.

28. A machine according to claim 27 including a gauge carried by said arm and having an actuating means engaged by an actuating portion on said slide.

29. A machine according to claim 27 in which said slide includes a tool clamp for receiving and clamping a tool bit, said bit having a semicircular mounting portion, and said clamp including a complemental socket for receiving and clamping the tool bit and adjusting screws for rocking it to different positions in said socket to align it horizontally with said spindle axis.

30. A machine according to claim 14 in which the eccentric is an assembly of a plurality of relatively rotatable eccentric members, and means for fixing the members in relatively adjusted positions.

31. A machine according to claim 30 in which the contact portion is on the end of a rod slidably mounted on the base plate, and a screw carried in a fixed position relative to the bench plate for engaging and adjusting said rod.

32. A machine according to claim 31 in which the means for rocking the eccentric comprises an actuating lever extending outwardly therefrom, and means on said pivoted tool-carriage arm for engaging said support at a predetermined position during its pivotal movement.

33. A machine according to claim 32 in which said engaging means is carried on said arm for adjustment to vary the point of engagement.

34. A machine for generating surfaces on a workpiece member comprising a unit for supporting a workpiece member and a unit for supporting a generating tool member so that the tool member carried thereby will engage the workpiece member carried by the first unit, one of said units being mounted for pivoting movement about a pivot so that the tool member will travel across the workpiece member with a predetermined radius, means for advancing or retracting one of said members relative to the other member during the pivotal movement of the unit to change said radius on the surface of the workpiece, said means including an eccentric unit; said unit which is mounted for pivotal movement including a moveable support which supports its said member for advancing or retracting movement relative to the other unit which includes a relatively fixed support, said eccentric unit being rotatably mounted on said moveable support, means for rotating said eccentric unit in response to pivotal movement of the pivoted unit, said moveable support being moveable in one direction to cause contact between said members, said eccentric unit being rotatably mounted on the moveable support in cooperative relationship to a contact portion relative to which said moveable support can move and which is operatively connected to said fixed support, said moveable support being moveable in said direction to a position where said contact portion is engaged by said eccentric unit.

35. A machine according to claim 34 in which the eccentric unit is formed of a plurality of adjustable parts so as to vary its degree of eccentricity.

36. A machine according to claim 34 in which said eccentric unit is mounted on said fixed support for rocking movement, an actuating arm extending from said eccentric unit for rocking it, and means on the pivoted unit for engaging said arm at a predetermined position during its pivoting movement.

37. A machine according to claim 36 in which said last-named means is adjustable to vary the point of engagement.

38. A machine according to claim 36 in which the eccentric unit is an assembly of relatively adjustable eccentric parts mounted on a supporting pin, and means for securing the parts in various relatively adjusted positions around the pin to adjust it from a zero position to a maximum position of eccentricity.

39. A machine according to claim 34 in which the one member is supported for rotation about an axis and the other member is carried by said moveable support which is mounted on the pivoted unit, said pivot being disposed at a right angle to said axis.

40. A machine according to claim 39 in which the workpiece member is carried for rotation by a driven spindle carried by the one unit and the tool member is carried by said moveable support of the other unit.

41. A lathe-type machine for generating surfaces on a workpiece according to claim 40 comprising a bench plate, said unit for supporting the workpiece comprising the fixed support in the form of a headstock unit mounted on the bench plate and supporting a spindle on which the workpiece is adapted to be mounted, means for driving the spindle about its axis, said tool-carrying unit being supported by said bench plate and adapted to position the generating tool in cooperation with the spindle-mounted workpiece, said tool-carrying unit comprising said moveable support in the form of a base plate mounted on the bench plate for movement along a centerline in the same plane as the spindle axis, a tool carriage arm mounted on said moveable base plate for swinging movement about a pivot having its axis at a right angle to said spindle axis and in said plane, said base plate being moveable on the bench plate toward the headstock unit to cause the supported tool and workpiece to engage each other, said eccentric unit being mounted for rocking movement on said base plate and engaging said contact portion which is movably mounted on said base plate, to cause said base plate to advance or retract relative to said headstock unit, said means for rotating said eccentric unit comprising means for rocking it in response to pivotal movement of said arm.

42. A machine according to claim 41 including a gauge operatively connected to said base plate for indicating its position on said bench plate.

43. A machine according to claim 41 in which the means for rockably mounting the eccentric unit on the bench plate locates it with its periphery engaging the moveable contact portion carried by said base plate, said mounting means being positioned posteriorly and laterally of the pivot.

44. A machine according to claim 43 in which the eccentric is an assembly of a plurality of relatively rotatable eccentric members, and means for fixing the members in relatively adjusted positions.

45. A machine according to claim 44 in which the contact portion is on the end of a rod slidably mounted on the base plate, and engages with a fixed contact portion in the form of a screw carried in a normally fixed position on the headstock for engaging and adjusting said rod.

46. A machine according to claim 44 including a gauge carried by the bench plate and having an actuating plunger engaged by a member carried by said base plate to indicate the position of the base plate on the bench plate.

47. A machine according to claim 41 in which the means for rocking the eccentric unit comprises an actuating lever extending outwardly therefrom, and means on said pivoted tool-carriage arm for engaging said lever at a predetermined position during its pivotal movement.

48. A machine according to claim 47 in which said engaging means is carried on said arm for adjustment to vary the point of engagement.

49. A machine according to claim 48 in which said engaging means is in the form of a depending pin carried by a lever pivoted to the lower side of said arm, and means for adjusting said lever about the pivot and holding it in adjusted position.

50. A machine according to claim 49 in which the eccentric unit is an assembly of a plurality of relatively rotatable eccentric members, and means for fixing the members in relatively adjusted positions.

51. A machine according to claim 50 in which the contact portion is on the end of a rod slidably mounted on the base plate and engages with a fixed contact portion in the form of a screw carried in a normally fixed position relative to the bench plate for engaging and adjusting said rod.

52. A machine for generating surfaces on a workpiece member comprising a unit for supporting a workpiece member and a unit for supporting a generating tool member so that the tool member carried thereby will engage the workpiece member carried by the first unit, one of said units being mounted for pivoting movement about a pivot so that the tool member will travel across the workpiece member with a predetermined radius, means for advancing or retracting one of said members relative to the other member during the pivotal movement of the unit to change said radius on the surface of the workpiece, said means including an eccentric unit; said unit which is mounted for pivotal movement including a moveable support which supports its said member for advancing or retracting movement relative to the other unit which includes a relatively fixed support, said eccentric unit being rotatably mounted on said moveable support, means for rotating said eccentric unit in response to pivotal movement of the pivoted unit, and an operative connection between said eccentric unit and said fixed support whereby rotation of said eccentric unit will advance or retract said moveable support relative to said fixed support to change said radius of the tool on the surface of the workpiece.

53. A machine for generating surfaces on a workpiece member comprising a unit for supporting a workpiece member and a unit for supporting a generating tool member so that the tool member carried thereby will engage the workpiece member carried by the first unit, one of said units being mounted for pivoting movement about a pivot so that the tool member will travel across the workpiece member with a predetermined radius, means for advancing or retracting one of said members relative to the other member during the pivotal movement of the unit to change said radius on the surface of the workpiece, said means including an eccentric unit, said unit which is mounted for pivotal movement including a moveable support which supports its said member for advancing or retracting movement relative to the other unit which includes a relatively fixed support, said eccentric unit being rotatably mounted, means for rotating said eccentric unit in accordance with pivotal movement of the pivoted unit, and means for operatively connecting said eccentric unit between said moveable support and said fixed support whereby rotation of said eccentric unit will advance or retract said moveable support relative to the fixed support to change said radius of the tool on the surface of the workpiece.

* * * * *

UNITED STATES PATENT OFFICE
CERTIFICATE OF CORRECTION

Patent No. 4,051,751        Dated October 4, 1977

Inventor(s) Otto Estarda

It is certified that error appears in the above-identified patent and that said Letters Patent are hereby corrected as shown below:

Column 1, line 8, change "wingable" to -- swingable --.

line 10, change "retacting" to -- retracting --.

Column 3, line 2, change "slidable" to -- slidably --.

Signed and Sealed this

Thirty-first Day of January 1978

[SEAL]

Attest:

RUTH C. MASON
Attesting Officer

LUTRELLE F. PARKER
Acting Commissioner of Patents and Trademarks